(12) United States Patent
Fauland

(10) Patent No.: US 10,665,846 B2
(45) Date of Patent: May 26, 2020

(54) METHOD FOR CONNECTING SEVERAL GALVANIC CELLS AND CELL CONNECTOR THEREFORE

(71) Applicant: SAMSUNG SDI CO., LTD., Yongin-si, Gyeonggi-do (KR)

(72) Inventor: David Fauland, Groß St. Florian (AT)

(73) Assignee: Samsung SDI Co., Ltd., Yongin-si (KR)

(*) Notice: Subject to any disclaimer, the term of this patent is extended or adjusted under 35 U.S.C. 154(b) by 46 days.

(21) Appl. No.: 15/826,399

(22) Filed: Nov. 29, 2017

(65) Prior Publication Data
US 2018/0083250 A1    Mar. 22, 2018

Related U.S. Application Data

(62) Division of application No. 14/668,936, filed on Mar. 25, 2015, now Pat. No. 9,865,860.

(30) Foreign Application Priority Data

Mar. 25, 2014 (DE) ................. 10 2014 205 522

(51) Int. Cl.
| | |
|---|---|
| *H01M 10/0525* | (2010.01) |
| *H01M 2/20* | (2006.01) |
| *B23K 20/00* | (2006.01) |
| *B23K 20/10* | (2006.01) |

(52) U.S. Cl.
CPC ........... *H01M 2/204* (2013.01); *B23K 20/002* (2013.01); *B23K 20/10* (2013.01); *H01M 2/206* (2013.01); *H01M 2220/20* (2013.01); *Y10T 29/49169* (2015.01)

(58) Field of Classification Search
CPC ........................... H01M 10/0525; H01M 2/30
See application file for complete search history.

(56) References Cited

U.S. PATENT DOCUMENTS

| | | |
|---|---|---|
| 6,449,082 B1 | 9/2002 | Agrawal et al. |
| 7,578,702 B1 | 8/2009 | Tom et al. |
| 2010/0019005 A1 | 1/2010 | Gouldson |
| 2014/0342213 A1 | 11/2014 | Ebisawa et al. |

FOREIGN PATENT DOCUMENTS

| | | |
|---|---|---|
| DE | 102010008582 A1 | 10/2010 |
| DE | 102010019708 A1 | 11/2011 |
| JP | 2013-140709 A1 | 7/2013 |
| WO | WO2012030179 * | 3/2012 |
| WO | WO 2013/000889 A1 | 1/2013 |

* cited by examiner

*Primary Examiner* — Olatunji A Godo
(74) *Attorney, Agent, or Firm* — Lewis Roca Rothgerber Christie LLP

(57) ABSTRACT

A cell connector to connect a plurality of galvanic cells, system comprising a plurality of galvanic cells, and a method to connect a plurality of galvanic cells. The the cell connector including a longitudinal, planar base section having opposite-lying first and second longitudinal edges. A planar, first connecting tab is connected to the base section on the first longitudinal edge thereof, the plane of the first connecting tab being aligned at a right angle to the base section. A planar, second connecting tab is connected to the base section on the second longitudinal edge thereof, the plane of the second connecting tab being aligned at a right angle to the plane of the base section.

6 Claims, 3 Drawing Sheets

METHOD FOR CONNECTING SEVERAL GALVANIC CELLS AND CELL CONNECTOR THEREFORE

CROSS-REFERENCE TO RELATED APPLICATIONS

This application is a divisional of U.S. patent application Ser. No. 14/668,936, filed Mar. 25, 2015, entitled "METHOD FOR CONNECTING SEVERAL GALVANIC CELLS AND CELL CONNECTOR THEREFORE," which claims priority under 35 U.S.C. § 119 to German Patent Publication No. DE 10 2014 205 522.9, filed on Mar. 25, 2014, which is hereby incorporated by reference in its entirety.

TECHNICAL FIELD

Embodiments relate to a cell connector to connect a plurality of galvanic cells, the cell connector comprising a longitudinal, planar base section having two opposite-lying longitudinal edges, a planar, first connecting tab that is connected to the base section on the first longitudinal edge thereof, the plane of the first connecting tab being aligned at a right angle to the base section, and a planar, second connecting tab that is connected to the base section on the second longitudinal edge thereof, the plane of the second connecting tab being aligned at a right angle to the plane of the base section.

Embodiments also relate to a system comprising a plurality of galvanic cells having longitudinal tab-shaped electrical terminal connectors, and a method to connect a plurality of galvanic cells.

BACKGROUND

A cell connector to connect a plurality of galvanic cells, a system and a method to connect a plurality of galvanic cells are essentially known from the prior art. It is known to connect galvanic cells in series and/or parallel in order to achieve a total voltage that exceeds the voltage of an individual cell and/or to achieve a total current that exceeds the current of an individual cell.

In particular, in the case of high packing densities, as is the case by way of example in the case of accumulators or rather batteries for vehicles, it is problematic to electrically connect the individual cells. On the one hand, the connecting surface is relatively large owing to the high currents in batteries of this type; on the other hand, the space between the cells for arranging a tool to connect the cells is relatively small.

Accumulators of this type are frequently constructed with the aid of so-called "pouch cells." The housing of a pouch cell is not rigid but rather flexible and is based by way of example on a pouch that is produced from aluminium foil. The actual cells are located welded in this foil and have terminal tabs that are guided to the exterior and in most cases the terminal tabs comprise a longitudinal form. While connecting the pouch cells, the terminal tabs are attached by way of example by ways of laser welding or ultrasonic welding. Various module head embodiments and attachment methods are known for this purpose.

By way of example, German Patent Publication No. DE 10 2010 008 582 A1, WO 2013/000889 A1 and U.S. Patent Publication No. 2010/0190055 A1 respectively disclose accumulators that are constructed from stacked individual cells and whose connecting lugs are connected with the aid of cell connectors. DE 10 2010 008 582 A1 specifically describes a method in which the connection terminal stack is pressed together with the aid of an air current. In U.S. Patent Publication No. 2010/0190055 A1, the terminal tabs of the individual cells are connected to one another with the aid of U-shaped cell connectors.

In general, thin-walled pouch cells with a thickness of less than approximately 7 mm are currently only cost-effectively produced by ways of laser welding methods if the pouch cell-to-pouch cell spacing may not be increased. In the case of pouch cells that are more than approximately 7 mm thick, the ultrasonic welding method may also be used. However, the joining area that may be produced in one working step is limited to 25 mm$^2$ so that it is necessary to weld a terminal tab in general in a plurality of working steps, in order to achieve the necessary current cross section, but also to ensure a cost-effective portable tool service life of the ultrasonic welding head. The proposed numerical values are of course only to be understood as approximate values to illustrate the problem in accordance with the invention, they are not, however, used to categorically rule out a joining method for specific application cases.

In general, an ultrasonic welding tool should be embodied in a relatively solid manner to ensure good thermal dissipation properties. The forces that are to be applied and vibrations that occur require a robust construction. This is set against the fact that it is not possible to embody the anvil and the sonotrode of an ultrasonic welding tool in an arbitrarily solid manner owing to the cell density and consequently owing to the limited accessibility to the terminal tabs of the cells.

SUMMARY

In accordance with embodiments, an enhanced cell connector, an enhanced system of galvanic cells, and an enhanced method to connect galvanic cells are provided. In particular, the accessibility to the terminal tabs of the cells is to be enhanced and the use of comparatively bulky connecting tools is to be rendered possible.

In accordance with embodiments, a cell connector to connect a plurality of galvanic cells is provided, in which a pair of connecting tabs are arranged offset with respect to one another in the longitudinal direction of the base section.

In accordance with embodiments, a system comprising a plurality of galvanic cells having longitudinal tab-shaped electrical terminal connectors, in which the terminal tabs of various galvanic cells are arranged offset with respect to one another in the longitudinal direction of the terminal tabs during the process of stacking galvanic cells. This may affect both stacking the galvanic cells in the same direction, in which the cells are prepared for an electrical parallel connection, as well as stacking the galvanic cells in the opposite direction, in which the adjacent cells are rotated about in each case 180° and are prepared for an electrical series connection. Consequently, in particular in the case of stacking galvanic cells in the same direction, it is possible for the terminal tabs of various galvanic cells, but comprising identical polarity, to be arranged offset with respect to one another in the longitudinal direction of the terminal tabs.

In accordance with embodiments, a method to connect a plurality of galvanic cells, and which includes at least one of: providing the galvanic cells, arranging terminal tabs of adjacent galvanic cells that are to be connected offset with respect to one another in a longitudinal direction of the terminal tabs; providing a cell connector that has a longitudinal, planar base section with two opposite-lying longitudinal edges, a planar, first connecting tab that is connected to the base section on the first longitudinal edge thereof, the plane of the first connecting tab being aligned at a right angle to the plane of the base section, and a planar, second connecting tab that is connected to the base section on the second longitudinal edge thereof, the plane of the second connecting tab being aligned at a right angle to the plane of the base section, wherein the first and second connecting tabs are arranged offset with respect to one another in the longitudinal direction of the base section; arranging the cell connector in such a manner that each connecting tab of the cell connector lies opposite a respective terminal tab of a cell; and connecting the terminal tabs of the cells to the first and second connecting tabs.

Alternatively, in lieu of providing cells having offset terminal tabs, it is possible, in accordance with embodiments, to provide cells that comprise identical terminal tabs, wherein a part of the mentioned terminal tabs is removed in such a manner that the terminal tabs of adjacent galvanic cells that are to be connected are arranged offset with respect to one another in the longitudinal direction of the terminal tabs. In other words, a method to connect a plurality of galvanic cells is consequently provided and which includes at least one of: providing galvanic cells that comprise identical terminal tabs; removing a part of the terminal tabs in such a manner that the terminal tabs of adjacent galvanic cells that are to be connected are arranged offset with respect to one another in the longitudinal direction of the terminal tabs; providing a cell connector that comprises a longitudinal, planar base section having two opposite-lying longitudinal edges, the cell connector also having a planar, first connecting tab that is connected to the base section on the first longitudinal edge thereof, the plane of the first connecting tab being aligned at a right angle to the plane of the base section, and a planar, second connecting tab that is connected to the base section on the second longitudinal edge thereof, the plane of the second connecting tab being aligned at a right angle to the plane of the base section, wherein the first and second connecting tabs are arranged in the longitudinal direction of the base section; arranging the cell connector in such a manner that each connecting tab of the cell connector lies opposite a respective terminal tab of a cell; and connecting the first and second terminal tabs of the cells to the connecting tabs of the cell connector.

As a result of the proposed measures, the accessibility to the terminal tabs of the galvanic cells of a cell stack or respectively to the connecting tabs of the cell connector that is used to electrically connect the cells is improved. In particular, therefore, the use of comparatively solidly embodied tools to connect the terminal tabs/connecting tabs is rendered possible.

Further advantageous embodiments and further developments of the invention are evident in the dependent claims and also in the description in conjunction with the figures.

In accordance with embodiments, it is cost-effective if the two connecting tabs comprise an overlapping region in the mentioned longitudinal direction. In other words, the total length of the two connecting tabs is greater than or equal to the length of the base section that is occupied by the two connecting tabs. In this manner, it is possible to achieve comparatively large connecting tabs (and therefore large current cross sections) in the case of only a small total length of the cell connector.

In accordance with embodiments, it is similarly cost-effective if in the case of the system having a plurality of galvanic cells, the terminal tabs comprise an overlapping region in the mentioned longitudinal direction. In this manner, it is possible to achieve comparatively large terminal tabs and therefore large current cross sections.

In accordance with embodiments, it is also cost-effective if a free space is arranged between the two connecting tabs in the mentioned longitudinal direction. In other words, the total length of the two connecting tabs is smaller than or equal to the length of the base section that is occupied by the two connecting tabs. As a consequence, it is possible to achieve particularly good access to the connecting tabs.

In accordance with embodiments, it is similarly cost-effective if, in the case of the system having a plurality of galvanic cells, a free space is arranged between the mentioned connecting tabs in the mentioned longitudinal direction. As a consequence, it is possible to achieve particularly good access to the terminal tabs.

In accordance with embodiments, it is furthermore cost-effective if the cell connector is embodied as a component formed from sheet metal. By way of example, a corresponding blank may be bent into a U-shape for this purpose.

In accordance with embodiments, it is also cost-effective if the cell connector is produced from a U-profile, in particular from an extruded U-profile. A U-profile is tailored to the necessary length and the two arms of the U-profile are removed in regions (for example stamped out, milled out).

In accordance with embodiments, it is advantageous if the galvanic cells are electrically connected with the aid of a cell connector of the mentioned type. The space between the connecting tabs of two galvanic cells may be bridged as a result of using the cell connector.

In accordance with embodiments, it is particularly advantageous if the cells (or respectively their terminal tabs) have been, or rather, are ultrasonically welded to the cell connector. Ultrasonic metal welding is particularly well suited to connecting galvanic cells since it is a friction welding process involving only a limited heat input. It is thus advantageously possible to provide a particularly good weld at the copper-aluminium transitions that frequently occur during the production of accumulators, whereby the use of specific bimetal contacts may be omitted. In particular, thin pouch cells having a thickness of less than 7 mm may also be ultrasonically welded. In the case of welding pouch cells having a thickness of more than 7 mm, it is possible to achieve in one step in particular a connecting surface that is enlarged with respect to the prior art.

In accordance with embodiments, the cell connector may be connected so as to indirectly dissipate heat to an air or water cooling system, in particular by way of a thermal pad connection. Alternatively, the cell connector may be embodied with an enlarged surface, in particular by ways of forming a rib structure, for the purpose of improving the direct transfer of heat.

At this point it is noted that the variants that are disclosed in relation to the method and the advantages that result of the variants likewise relate to the disclosed covering and also to the galvanic cell and vice versa.

The above embodiments and further developments of the invention may be combined in a user-defined manner.

DRAWINGS

Embodiments will be illustrated by way of example in the drawings and explained in the description hereinbelow.

DESCRIPTION

Figure 1:
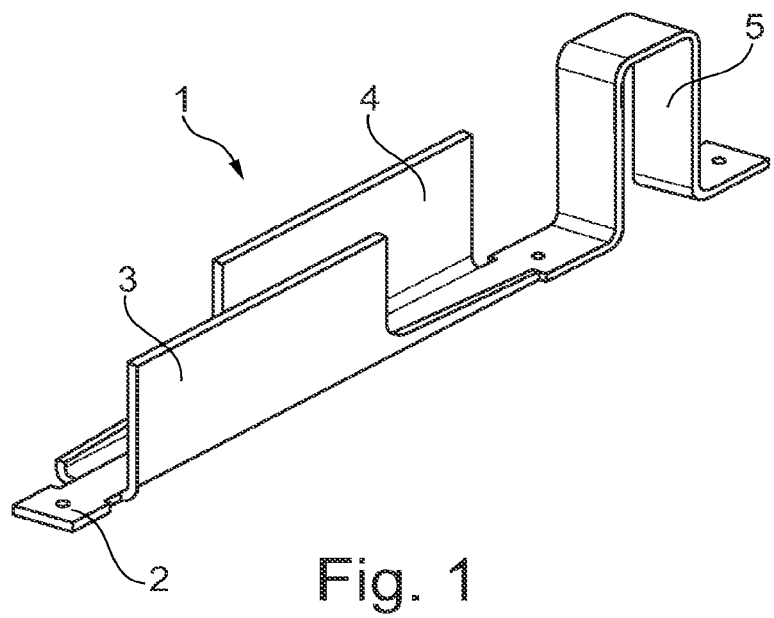
FIG. 1 illustrates a perspective view of a cell connector, in accordance with embodiments.

FIG. 1 illustrates an exemplary cell connector 1 to connect a plurality of galvanic cells. The cell connector 1 comprises a longitudinal, planar base section 2 having two opposite-lying longitudinal edges.

The cell connector 1 also comprises a planar, first connecting tab 3 that is connected to the base section 2 on a first longitudinal edge thereof. The plane of the first connecting tab 3 is aligned at a right angle to the plane of the base section 2.

The cell connector also comprises a planar, second connecting tab 4 that is connected to the base section 2 on a second longitudinal edge thereof. The plane of the second connecting tab 4 is aligned at a right angle to the plane of the base section 2. In particular, the first connecting tab 3 and the second connecting tab 4 are arranged at a right angle to thereby define a U-shape with the base section 2.

The connecting tabs 3, 4 are arranged offset with respect to one another in the longitudinal direction of the base section 2. The connecting tabs 3, 4 have an overlapping region in the longitudinal direction of the base section 2. In other words, the total length of the connecting tabs 3, 4 is greater than or equal to the length of the base section 2 that is filled by the two connecting tabs 3, 4. In this manner, it is possible to achieve comparatively large connecting tabs 3, 4, and therefore, large current cross-sections, in the case of a small total length of the cell connector 1.

It would also be feasible to arrange a free space between the connecting tabs 3, 4 in the longitudinal direction of the base section 2. In other words, the total length of the connecting tabs 3, 4 is less than or equal to the length of the base section 2 that is occupied by the connecting tabs 3, 4. As a consequence, it is possible to achieve particularly enhanced access to the connecting tabs.

In accordance with embodiments, the cell connector 1 also comprises a connection region 5 on which, for example, an electronic monitoring and/or control circuit (also see FIG. 3) may be connected to the galvanic cells. Advantageously, the cell connector 1 is embodied for this purpose as a component formed from sheet metal as is illustrated in FIG. 1. It would, however, also be feasible in principle that the cell connector 1 is produced from a U-profile, in particular from an extruded U-profile. The two arms of the U-profile may be removed in regions (for example, stamped out, milled out) so that the connecting tabs 3, 4 that are offset with respect to one another are produced. In particular, the cell connector 1 may also be encased in part with a synthetic material (for example, injection moulded).

Figure 2:
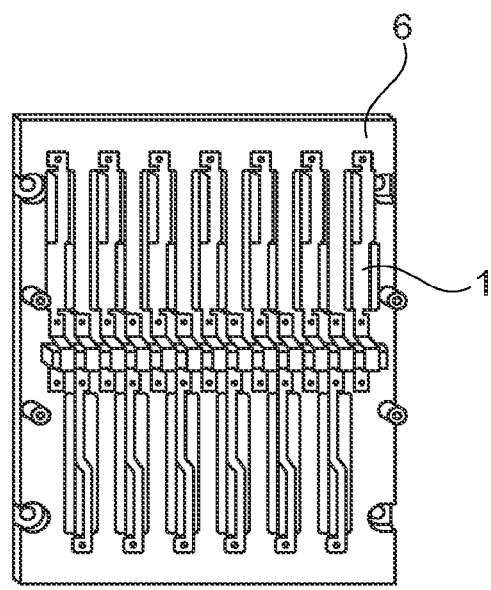
FIG. 2 illustrates a plurality of cell connectors of FIG. 1 that are mounted on a base plate.
Figure 3:
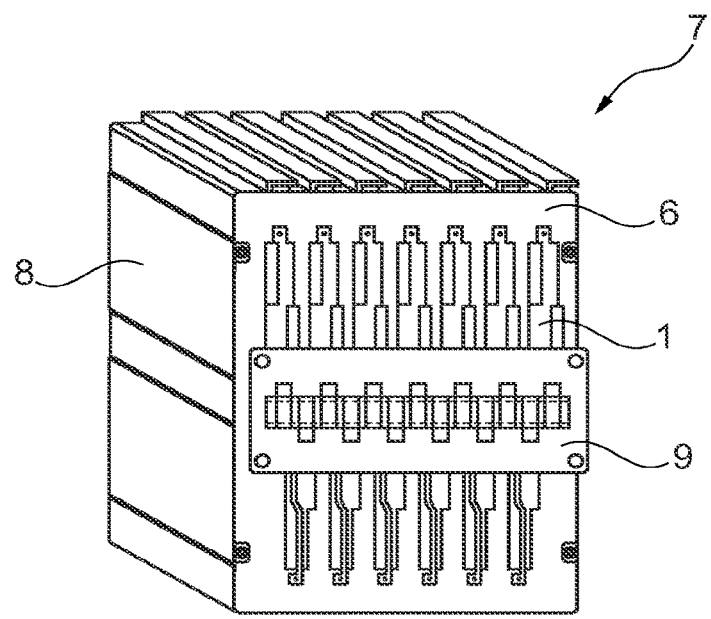
FIG. 3 illustrates an accumulator, in accordance with embodiments.

FIG. 2 illustrates an arrangement of a plurality of cell connectors 1 that are mounted on a base plate 6. FIG. 3 illustrates a battery/accumulator 7 that comprises a plurality of stacked galvanic cells 8. The galvanic cells 8 are electrically connected with the aid of the cell connectors 1. In addition, the terminal tabs of the galvanic cells 8 are guided through the base plate 6 so that they lie opposite the connecting tabs 3, 4 of the cell connectors 1.

FIG. 3 illustrates an electronic monitoring and/or control circuit 9 that is connected by way of the connection regions 5 to the cell connectors 1, and therefore, to the cells 8.

Furthermore, the cell connectors 1 may also be guided to a cooling system by way of example, via thermo mats, whereby the cells 8 are cooled at a point where the temperature is the highest, namely, in the region of terminal tabs.

Figure 4:
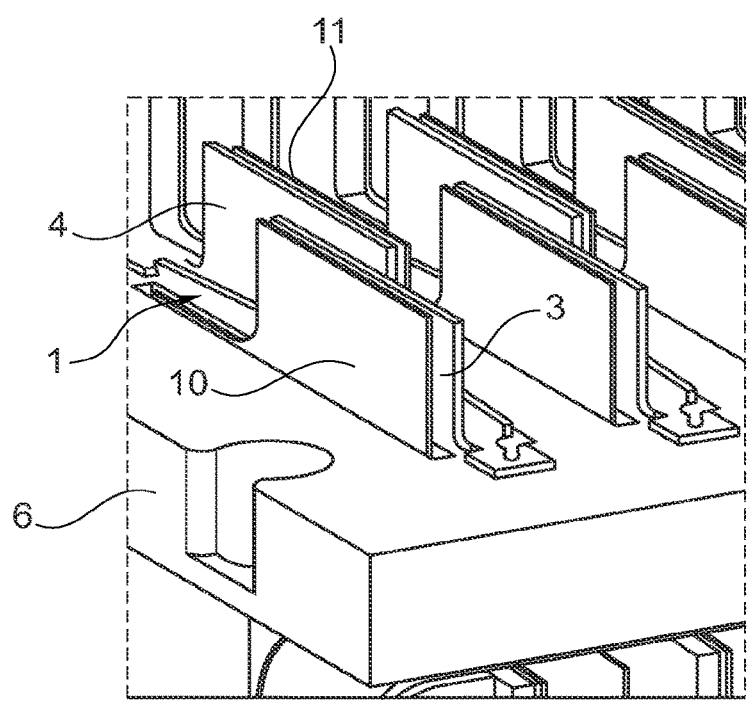
FIG. 4 illustrates a detailed view of the accumulator of FIG. 3.

FIG. 4 illustrates a detail of the accumulator 7 in an inclined view. The cell connectors 1 that are mounted on the base plate 6 and the terminal tabs 10, 11 of the galvanic cells 1 are easily recognizable, the terminal tabs being guided through the base plate 6. A respective terminal tab 10, 11 lies opposite a connecting tab 3, 4.

For the construction of the accumulator 7, a system is used comprising a plurality of galvanic cells 8 having longitudinal tab-shaped electrical connectors 10, 11, wherein the terminal tabs 10, 11 of adjacent galvanic cells 8 that are to be connected are arranged offset with respect to one another in the longitudinal direction of the terminal tabs 10, 11. In particular, the terminal tabs 10, 11 of various galvanic cells 8, but comprising identical polarity, may be arranged offset with respect to one another in order to render it possible to connect the cells 8 in a parallel connection.

Specifically, the mentioned terminal tabs 10, 11 in the illustrated example comprise an overlapping region in the mentioned longitudinal direction. In this manner, it is possible to achieve comparatively large current cross sections to the connecting tabs 3, 4 of the cell connector 1. Fundamentally, a free space could also be arranged between the mentioned terminal tabs 10, 11 in the mentioned longitudinal direction. As a consequence, a particularly good access to the terminal tabs 10, 11 is achieved.

To electrically connect a plurality of galvanic cells 8 with the aid of the cell connector 1, the following may be implemented. Providing cells 8, wherein the terminal tabs 10, 11 of adjacent galvanic cells 8 that are to be connected are arranged offset with respect to one another in the longitudinal direction of the terminal tabs 10, 11.

Next, providing a cell connector 1 that comprises a longitudinal, planar base section 2 having two opposite-lying longitudinal edges, the cell connector also comprises a planar, first connecting tab 3 that is connected to the base section 2 on the first longitudinal edge thereof, the plane of the connecting tab being aligned at a right angle to the plane of the base section 2, and a planar, second connecting tab 4 that is connected to the base section 2 on the second longitudinal edge thereof, the plane of the second connecting tab 4 being aligned at a right angle to the plane of the base section 2, the connecting tabs 3, 4 being arranged offset with respect to one another in the longitudinal direction of the base section 2.

Next, arranging the cell connector 1 in such a manner that each connecting tab 3, 4 of the cell connector 1 lies opposite a terminal tab 10, 11 of a cell 8.

Then, connecting the terminal tabs 10, 11 of the cells 8 to the connecting tabs of the cell connector 1.

If a system comprising a plurality of galvanic cells 8 having offset terminal tabs 10, 11 is not available, it is thus, possible in lieu of cells 8 having terminal tabs 10, 11 that are offset with respect to one another to provide cells 8 that comprise identical terminal tabs 10, 11, wherein a part of the terminal tabs 10, 11 is removed in such a manner that the terminal tabs 10, 11 of various adjacent cells 8 that are to be connected are arranged offset with respect to one another in the longitudinal direction of the terminal tabs 10, 11.

In other words, in the case of a method of this type for electrically connecting a plurality of galvanic cells 8 with the aid of the cell connector 1, the following may be implemented. Providing cells 8 that comprise identical terminal tabs 10, 11.

Next, removing a part of the terminal tabs 10, 11 in such a manner that the terminal tabs 10, 11 of adjacent cells 8 that are to be connected are arranged offset with respect to one another in the longitudinal direction of the terminal tabs 10, 11.

Next, providing a cell connector 1 that comprises a longitudinal, planar base section 2 having two opposite-lying longitudinal edges, the cell connector 1 comprising a planar, first connecting tab 3 that is connected to the base section 2 on the first longitudinal edge thereof, the plane of the first connecting tab 3 being aligned at a right angle to the plane of the base section 2, and a planar, second connecting tab 4 that is connected to the base section 2 on the second longitudinal edge thereof, the plane of the second connecting tab 4 being aligned at a right angle to the plane of the base section 2, the connecting tabs 3, 4 being arranged offset with respect to one another in the longitudinal direction of the base section 2.

Next, arranging the cell connector 1 in such a manner that each connecting tab 3, 4 of the cell connector 1 lies opposite a respective terminal tab 10, 11 of a cell 8.

Then, connecting the terminal tabs 10, 11 of the cells 8 to the connecting tabs 3, 4 of the cell connector 1.

In general, it is possible to connect the connecting tabs 3, 4 and the terminal tabs 10, 11 to one another in various ways. By way of example, they may be laser welded or also screwed together; moreover, it would be possible to use clinching and heat stamping methods. It is particularly advantageous, however, if the cells 8 (or respectively their terminal tabs 10, 11) are ultrasonically welded to the cell connector 1. The cells 8 are only slightly loaded as a result of the low transfer of heat. It is thus advantageously possible to provide a particularly good weld at the copper-aluminium transitions that frequently occur during the production of accumulators 7. As a result of the proposed measures, it is also possible to ultrasonically weld thin cells 8 or rather it is possible to achieve in one step a connecting surface that is enlarged with respect to the prior art.

Figure 5:
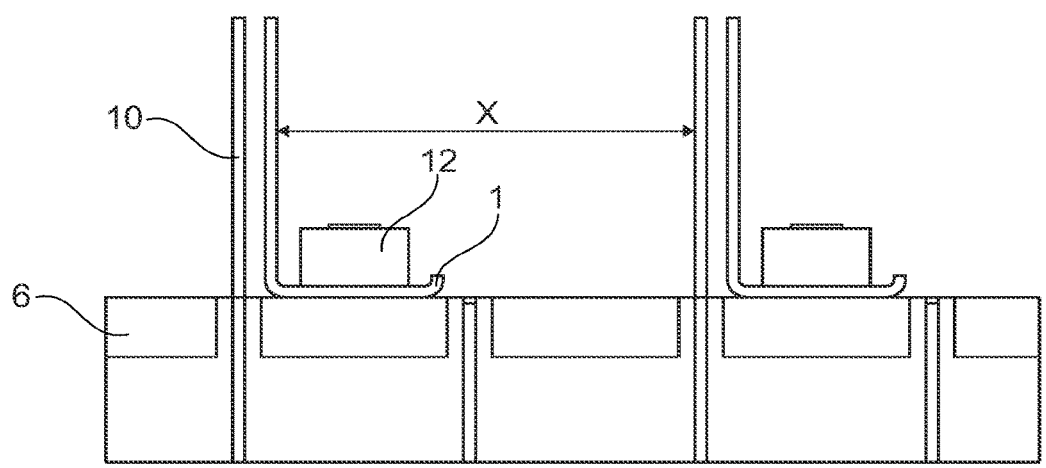
FIG. 5 illustrates a side view of the connecting tabs/terminal tabs of the accumulator in FIG. 3.

FIG. 5 illustrates a side view of a detail of the accumulator 7. The cell connectors 1, which are screwed onto the base plate 6 with the aid of screws 12, and also the connecting tabs 10 are evident. In particular, the comparatively large spacing x between two connecting tabs 10 is evident.

It is maintained that the components of the figures where necessary are not illustrated to scale and that the individual variants that are illustrated in the figures may also form the subject of a dependent invention. Position indicators such as "right-hand side," "left-hand side," "above," "below," and the like relate to the illustrated position of the respective component and in the case of any change to the mentioned position, corresponding changes to the position indicators need to be taken into account. Furthermore, it is noted that the illustrated cell connector 1 or rather accumulators may of course comprise more components than are illustrated without departing from the fundamental idea of embodiments.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A cell connector to connect a plurality of galvanic cells, the cell connector comprising:
    a planar base section extending longitudinally and having first and second opposite longitudinal edges;
    a planar, first connecting tab extending from the base section at the first longitudinal edge thereof, a plane of the first connecting tab being aligned at a right angle to a plane of the base section; and
    a planar, second connecting tab extending from the base section at the second longitudinal edge thereof, a plane of the second connecting tab being aligned at a right angle to a plane of the base section,
    wherein the first connecting tab and the second connecting tab are arranged offset with respect to one another in the longitudinal direction of the base section, the first and second connecting tabs extend less than the entire length of the base section in the longitudinal direction.

2. The cell connector of claim 1, wherein the first connecting tab and the second connecting tab define an overlapping region in the longitudinal direction of the base section.

3. The cell connector of claim 1, further comprising a space arranged between the first connecting tab and the second connecting tab in the longitudinal direction of the base section.

4. The cell connector of claim 1, wherein the base section, the first connecting tab and the second connecting tab are composed of sheet metal.

5. The cell connector of claim 1, wherein the base section, the first connecting tab and the second connecting tab define a U-shaped profile.

6. The cell connector of claim 1, wherein the first connecting tab and the second connecting tab are integrally formed with the base section.

* * * * *